(12) United States Patent
Horie et al.

(10) Patent No.: US 9,400,011 B2
(45) Date of Patent: Jul. 26, 2016

(54) MOTION DEVICE

(71) Applicant: THK CO., LTD., Tokyo (JP)

(72) Inventors: Takuya Horie, Tokyo (JP); Mitsumasa Wada, Tokyo (JP); Ayako Miyajima, Tokyo (JP); Manabu Sato, Tokyo (JP); Akimasa Yoshida, Tokyo (JP); Marie Horikawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/387,769

(22) PCT Filed: Mar. 14, 2013

(86) PCT No.: PCT/JP2013/057219
§ 371 (c)(1),
(2) Date: Sep. 24, 2014

(87) PCT Pub. No.: WO2013/146301
PCT Pub. Date: Oct. 3, 2013

(65) Prior Publication Data
US 2015/0104122 A1    Apr. 16, 2015

(30) Foreign Application Priority Data

Mar. 27, 2012  (JP) ................................. 2012-072273
Mar. 4, 2013   (JP) ................................. 2013-041739

(51) Int. Cl.
*F16C 29/06* (2006.01)
*F16C 29/08* (2006.01)

(52) U.S. Cl.
CPC ............. *F16C 29/0607* (2013.01); *F16C 29/06* (2013.01); *F16C 29/065* (2013.01); *F16C 29/0609* (2013.01); *F16C 29/0611* (2013.01); *F16C 29/084* (2013.01)

(58) Field of Classification Search
CPC .. F16C 29/0609; F16C 29/0607; F16C 29/06; F16C 29/065; F16C 29/084; F16C 29/0611
See application file for complete search history.

(56) References Cited

U.S. PATENT DOCUMENTS 4,749,284 A * 6/1988 Teramachi .......... F16C 29/0642
                                                    384/45
4,932,067 A * 6/1990 Pester et al. .................... 384/45
(Continued)

FOREIGN PATENT DOCUMENTS

JP         2009-162279 A       7/2009

OTHER PUBLICATIONS

International Search Report dated Jun. 11, 2013, issued in corresponding application No. PCT/JP2013/057219.

*Primary Examiner* — Alan B Waits
(74) *Attorney, Agent, or Firm* — Westerman, Hattori, Daniels & Adrian, LLP

(57) ABSTRACT

A motion device (1) includes a track rail (10), a moving body (21), a plurality of rolling elements (70) rolling in an endless circulation passage formed at the track rail (10) and the moving body (21), a pair of lid bodies (50) attached to end surfaces of the moving body (21) in a movement direction thereof, and a connector cover body (80) disposed along a rolling element rolling surface (28) formed at the moving body (21) to cover a rolling element connector (72) connecting and holding the rolling elements (70). The connector cover body (80) has a frame-shaped cover member (86) which is fixed to the pair of the lid bodies (50) to be integrally disposed at both ends of the rolling element rolling surface (28) in a width direction thereof.

4 Claims, 13 Drawing Sheets

(56) References Cited

U.S. PATENT DOCUMENTS

| | | | |
|---|---|---|---|
| 5,295,748 A * | 3/1994 | Yamazaki | 384/45 |
| 5,340,219 A * | 8/1994 | Agari | 384/15 |
| 6,158,373 A * | 12/2000 | Lange et al. | 114/204 |
| 6,200,031 B1 * | 3/2001 | Faulhaber et al. | 384/45 |
| 6,210,040 B1 * | 4/2001 | Mischler | 384/45 |
| 7,066,650 B2 * | 6/2006 | Ishihara | 384/44 |
| 7,204,036 B2 * | 4/2007 | Kato et al. | 33/706 |
| 7,377,693 B2 * | 5/2008 | Tsai et al. | 384/45 |
| 7,380,988 B1 * | 6/2008 | Chen et al. | 384/15 |
| 7,832,930 B2 * | 11/2010 | Geka et al. | 384/44 |
| 8,123,408 B2 * | 2/2012 | Nishiwaki | 384/44 |
| 9,046,129 B1 * | 6/2015 | Liao | |
| 2009/0290820 A1 * | 11/2009 | Hsu | 384/45 |

* cited by examiner

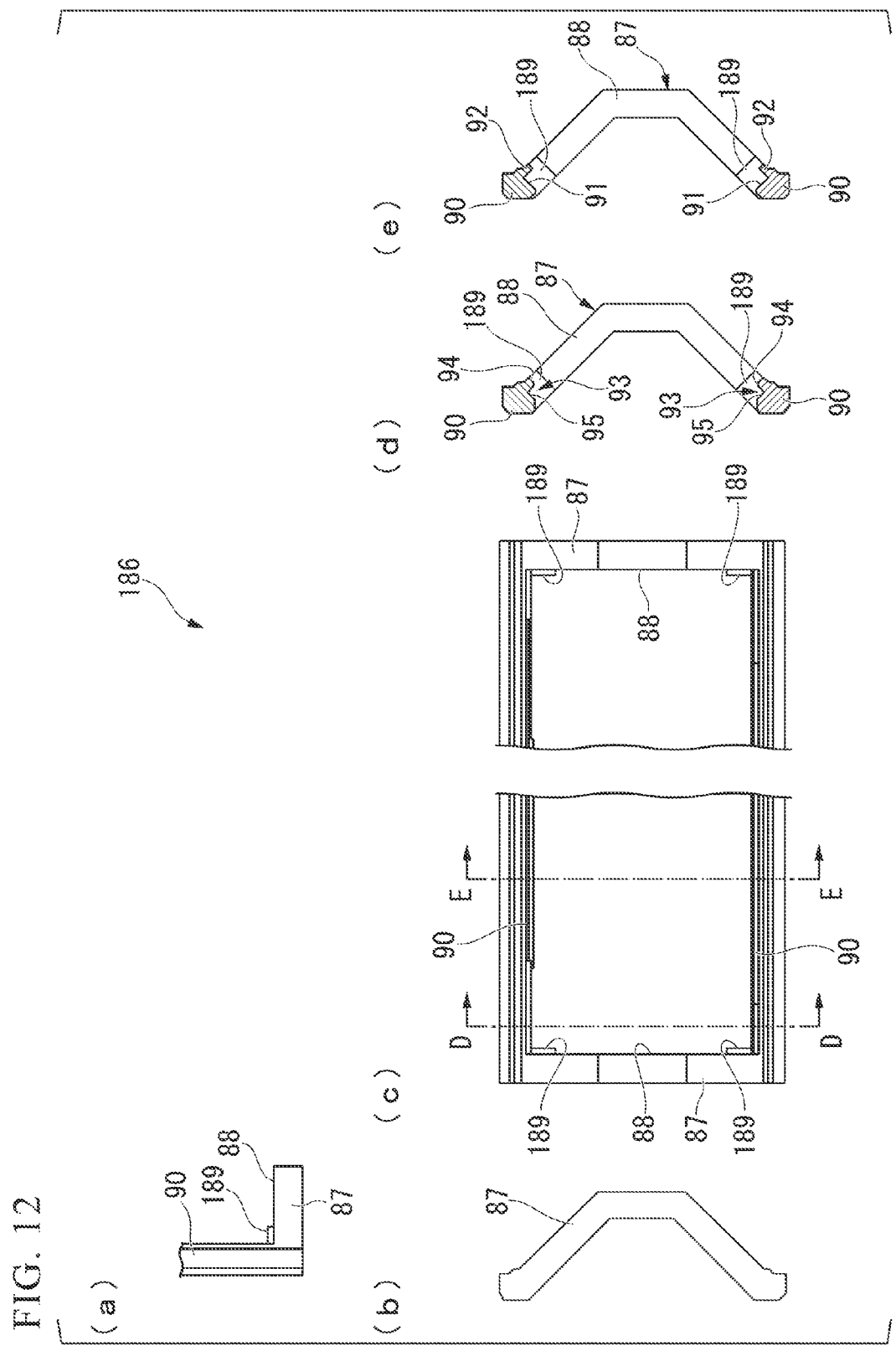

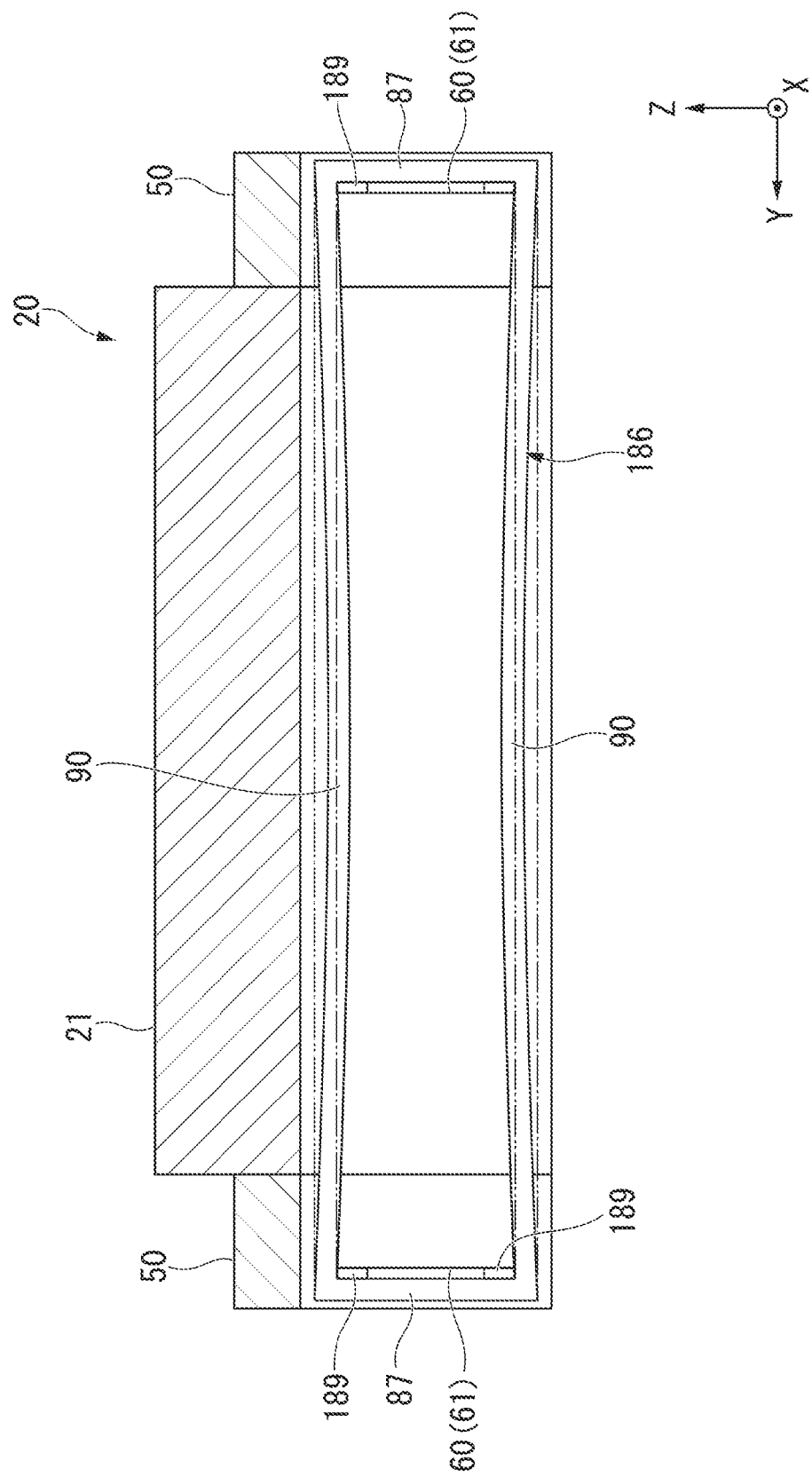

MOTION DEVICE

TECHNICAL FIELD

The present invention relates to a motion device.

Priority is claimed on Japanese Patent Application No. 2012-072273, filed Mar. 27, 2012, and Japanese Patent Application No. 2013-041739, filed Mar. 4, 2013, the contents of which are incorporated herein by reference.

BACKGROUND ART

A linear guide (linear motion guide) includes a guide rail, a slider block, and a rolling element. A circulation path of the rolling element is formed between the guide rail and the slider block. The guide rail and the slider block relatively operate (move) by circulation of the rolling element within the circulation path.

The rolling element accommodated in the circulation path is separated from the slider block when the guide rail is removed (pulled) from the slider block. When the rolling element is separated from the slider block, treatment at the time of assembly or repair is complicated and difficult. For this reason, the slider block is provided with a rolling element retainer for preventing separation of the rolling element.

CITATION LIST

Patent Literature

Patent Literature 1
Japanese Unexamined Patent Application, First Publication No. 2009-162279

SUMMARY OF INVENTION

Technical Problem

In the related art, the rolling element retainer consisting of a plurality of members is attached to end caps mounted on both ends of the slider block. However, the rolling element retainer is problematic in that assembly time is required due to an increase in the number of parts.

The present invention has been made in view of the above problem, and an object of the present invention is to provide a motion device with which assembly efficiency may be achieved.

Solution to Problem

According to a first aspect of the present invention, a motion device includes a track rail, a moving body movable along the track rail, a plurality of rolling elements rolling in an endless circulation passage formed at the track rail and the moving body, a pair of lid bodies attached to end surfaces of the moving body in a movement direction thereof, and a connector cover body disposed along a rolling element rolling surface formed at the moving body to cover a rolling element connector connecting and holding the rolling elements, wherein the connector cover body has a frame-shaped cover member which is fixed to the pair of the lid bodies to be integrally disposed at both ends of the rolling element rolling surface in a width direction thereof.

In a second aspect of the motion device according to the present invention, in the first aspect of the present invention, the frame-shaped cover member may be fixed to the pair of the lid bodies by a snap-fit method.

In a third aspect of the motion device according to the present invention, in the second aspect of the present invention, the frame-shaped cover member may have snap-fit engagement sections on inner peripheral surfaces of both end sides of a pair of cover sections disposed along the rolling element rolling surface, and the lid bodies may have snap-fit engaged sections with which the snap-fit engagement sections engage on surfaces facing the track rail.

In a fourth aspect of the motion device according to the present invention, in the third aspect of the present invention, the frame-shaped cover member may have a pair of connection sections connecting both ends of the pair of cover sections, and the connection sections may be elastically deformed when the snap-fit engagement sections engage with the snap-fit engaged sections.

In a fifth aspect of the motion device according to the present invention, in the fourth aspect of the present invention, the frame-shaped cover member may have tension application sections, which apply tension to the pair of cover sections, on inner peripheral surfaces of the connection sections.

In a sixth aspect of the motion device according to the present invention, in the fourth aspect of the present invention, the lid bodies may have regulatory surfaces facing inner peripheral surfaces of the connection sections to restrict movement of the frame-shaped cover member.

Advantageous Effects of Invention

According to the present invention, efficiency of assembly time, a reduction in product cost, etc. may be achieved since the number of parts of a connector cover body of a motion device may be reduced.

BRIEF DESCRIPTION OF DRAWINGS

FIG. 12 is a view illustrating a modified example of the upper/lower cover (upper/lower cover 186).
FIG. 13 is a view illustrating a fixed state of the upper/lower cover 186.

DESCRIPTION OF EMBODIMENTS

Hereinafter, a linear motion guide 1 according to an embodiment of the present invention will be described with reference to the drawings.

Figure 1:
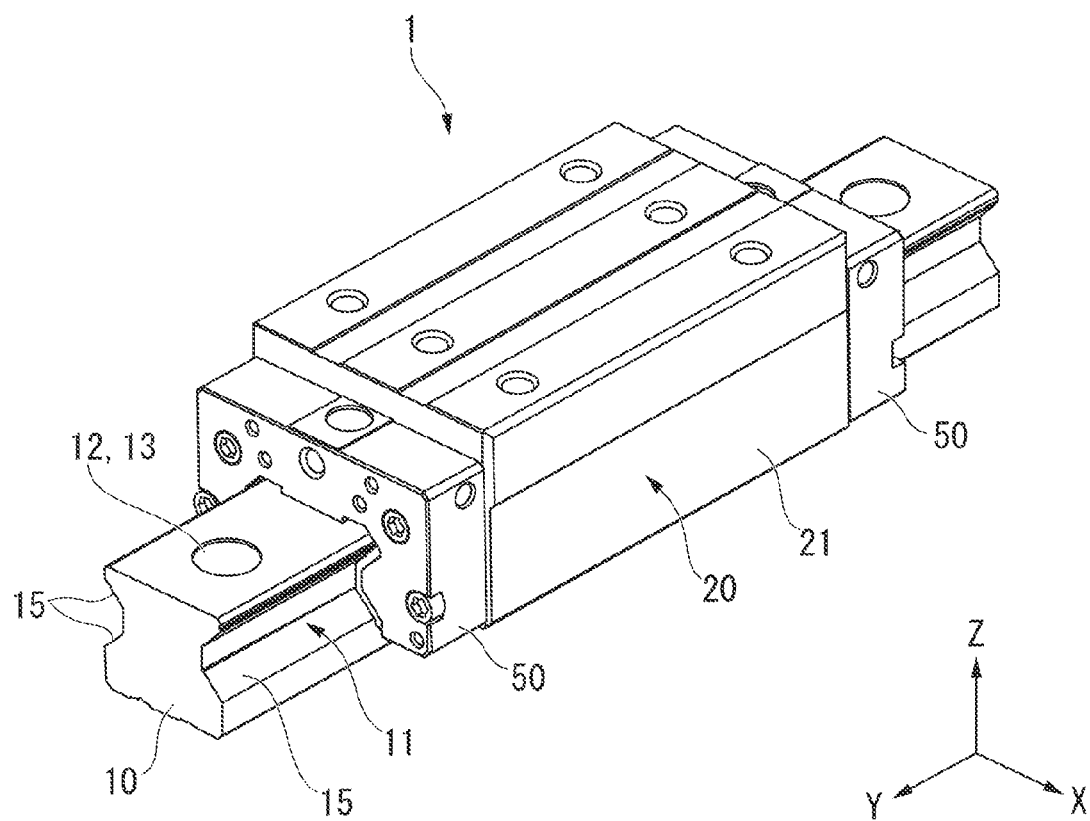
FIG. 1 is a perspective view illustrating an external appearance of a linear motion guide 1.

FIG. 1 is a perspective view illustrating an external appearance of a linear motion guide 1.

Figure 2:
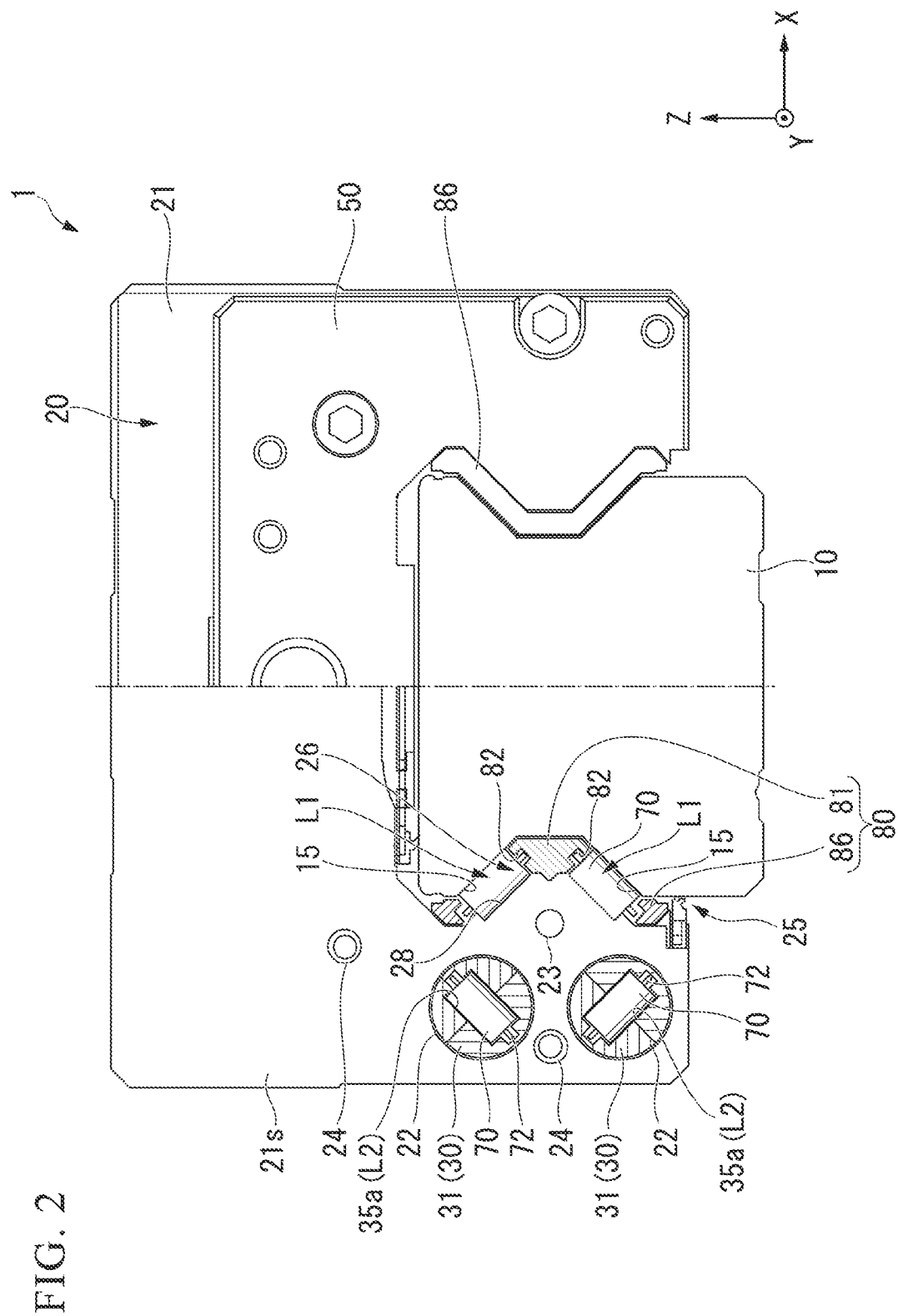
FIG. 2 is a front and cross-sectional view of the linear motion guide 1.

FIG. 2 is a front and cross-sectional view of the linear motion guide 1.

Figure 3:
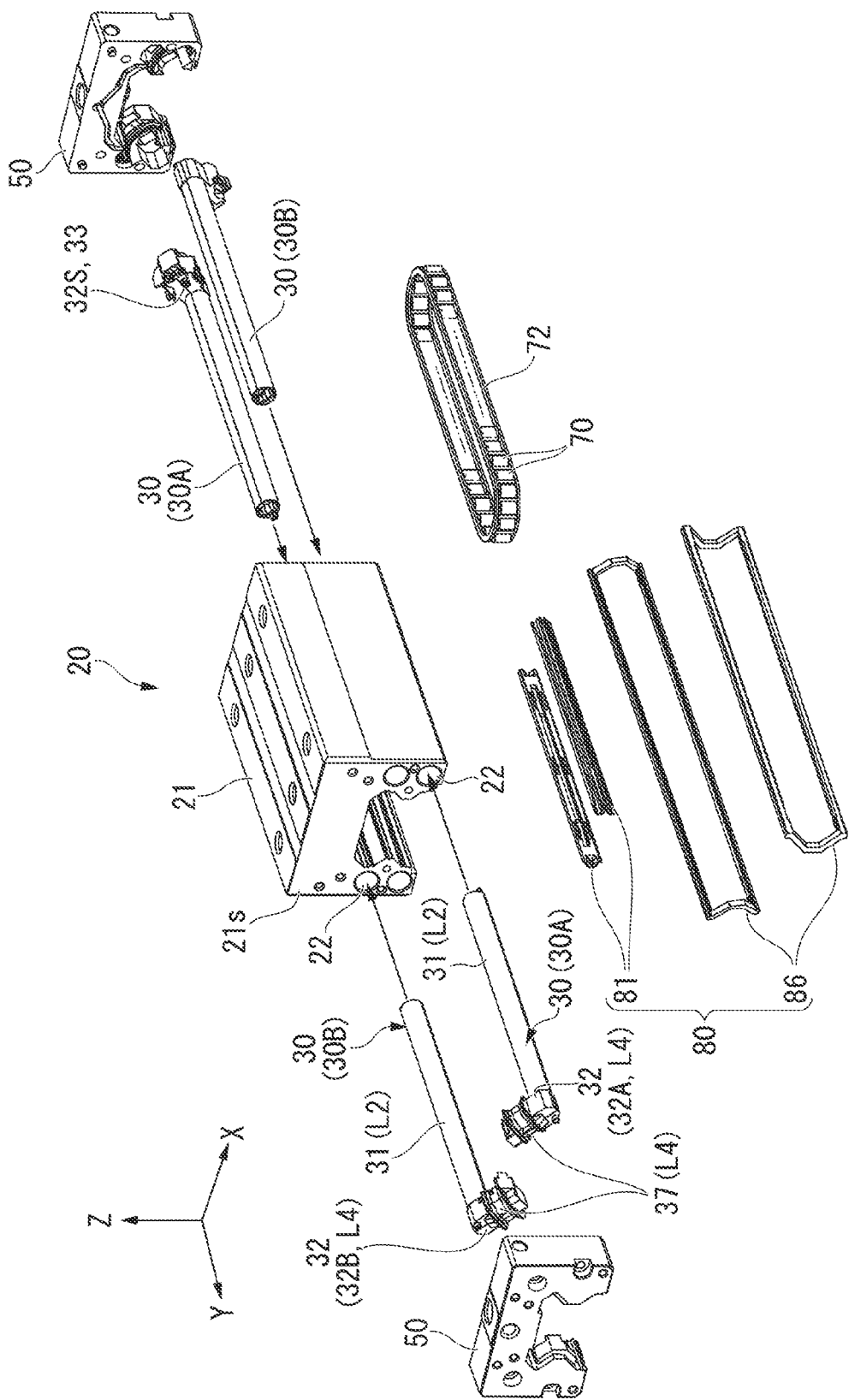
FIG. 3 is an exploded perspective view of a slider block 20.

FIG. 3 is an exploded perspective view of a slider block 20.

In the following description, a direction in which a track rail 10 and a slider block 20 overlap is referred to as a Z direction. In some cases, the +Z direction is referred to as an upper side and the −Z direction is referred to as a lower side.

A direction (a longitudinal direction of the slider block 20) in which the track rail 10 extends among directions perpendicular to the Z direction is referred to as a Y direction. In some cases, the Y direction is referred to as a movement direction or a thickness direction.

A direction perpendicular to the Z direction and Y direction is referred to as an X direction. In some cases, the X direction is referred to as a width direction.

A linear motion guide 1 includes the track rail 10, the slider block 20 movable in the extension direction of the track rail 10, etc.

The track rail (track body) 10 is a metal member having a substantially rectangular shape in a cross-section perpendicular to the Y direction. In a pair of outside surfaces 11 directed in the X direction among outer surfaces of the track rail 10, centers of the outside surfaces 11 in the Z direction are recessed more than both ends. The recessed portions are formed with smooth rolling element rolling surfaces 15 extending in the Y direction. One of the outside surfaces 15 is formed with a pair of rolling element rolling surfaces 15 which intersect (face) each other at an angle of 90 degrees. The track rail 10 has four rolling element rolling surfaces 15.

The track rail 10 has a plurality of bolt mounting holes 12 formed to be penetrated in the Z direction and spaced apart from each other in the Y direction. The track rail 10 is fixed to a base member or the like (not shown) by bolts 13 inserted into the bolt mounting holes 12.

The slider block (moving body) 20 includes a rectangular parallelepiped block body 21, turn pipes 30, each of which forms a portion of an endless circulation passage L within the slider block 20, and flat end plates 50 arranged at both end surfaces 21s of the block body 21 in the Y direction.

The slider block 20 further includes a plurality of rollers 70. Four endless circulation passages L forming an endless elliptical ring shape or an oval ring shape are formed in the slider block 20. The plurality of rollers 70 are maintained to be capable of rolling and running (rolling) within the four endless circulation passages L.

Each of the endless circulation passages L is configured of a pair of linear portions which extend in the Y direction and a pair of semicircular arc-curved portions which connect end portions of the pair of linear portions. One of the linear portions is a load rolling element rolling passage L1 and the other thereof is a non-load rolling element passage L2. The pair of semicircular arc-curved portions are rolling element direction changing passages L3 and L4.

The block body (moving body) 21 has a "C"-shaped or a "U"-shaped cross-section. The block body 21 has a groove section 25 which is formed in the Y direction at a bottom surface thereof and is opened in the −Z direction. The track rail 10 is accommodated with a slight gap in the groove section 25.

A pair of inside surfaces 26 of the groove section 25 are formed with protrusion portions configured to face the recessed portions of the outside surfaces 11 of the track rail 10. The protrusion portions are formed with smooth rolling element rolling surfaces 28 extending in the Y direction. One of the inside surfaces 26 is formed with a pair of rolling element rolling surfaces 28 which intersect each other back-to-back at an angle of 90 degrees. The block body 21 has four rolling element rolling surfaces 28.

The inside surfaces 26 are each provided with a retainer cover 80 (a central cover 81 and an upper/lower cover 86) for indirectly preventing separation of the rollers 70.

The four rolling element rolling surfaces 15 on the track rail 10 and the four rolling element rolling surfaces 28 on the block body 21 are arranged to face each other. A space (a chamber extending in the Y direction) defined between each of the rolling element rolling surfaces 15 and the associated rolling element rolling surface 28 becomes the load rolling element rolling passage L1 in which the rollers 70 roll.

The block body 21 has four through-holes 22 penetrated in the Y direction. The through-holes 22 are symmetrically provided two-by-two at both sides in the X direction, with the groove section 25 interposed therebetween. Two through-holes 22, which are provided at both sides in the X direction, are symmetrically provided at both sides in the Z direction with the protrusion portions on the inside surfaces 26 of the groove section 25 interposed therebetween.

The turn pipes 30 are inserted into the four through-holes 22. The four through-holes 22 are opened to the both end surfaces 21s of the block body 21 in the Z direction.

Both end surfaces 21s of the block body 21 in the Z direction are formed with positioning holes 23 for fixing the turn pipes 30. The block body 21 has four positioning holes 23.

In each of the end surfaces 21s, the positioning holes 23 are symmetrically provided one-by-one at both sides in the X direction, with the groove section 25 interposed therebetween. The positioning holes 23 are provided one-by-one at end surface portions corresponding to the protrusion portions on the inside surfaces 26 of the groove section 25.

Each of the positioning holes 23 is disposed at a center in the Z direction in relation to the two through-holes 22 which are provided at the both sides in the X direction. The two through-holes 22 are symmetrically provided at both sides in the Z direction with the positioning hole 23 interposed therebetween.

Tapped holes 24 used to fix the end plates 50 are formed four-by-four on the both end surfaces 21s of block body 21.

Each of the turn pipes 30 is a resin-formed member which forms a portion of the endless circulation passage L (LA) formed within the slider block 20.

The turn pipe 30 includes a long cylindrical pipe section 31 which forms the non-load rolling element passage L2 of the endless circulation passage L (LA), and a return section 32 which forms the rolling element direction changing passage L3 of the endless circulation passage L (LA). The return section 32 is integrally arranged at one end of the pipe section 31.

A first roller rolling hole 35a which has a rectangular cross-section and a linear shape is formed in the pipe section 31. The first roller rolling hole 35a serves as the non-load rolling element passage L2.

A second roller rolling hole (not shown) which has a rectangular cross-section and an arc shape according to the shape of the return section 32 is formed in the return section 32. The second roller rolling hole serves as the rolling element direction changing passage L3.

The first roller rolling hole 35a of the pipe section 31 and the second roller rolling hole 35b of the return section 32 communicate with and are integrally formed with each other so as to form a roller rolling hole (not shown) having a "J" shape.

An outer surface of the return section 32 forms a portion of another endless circulation passage L (LB) different from the endless circulation passage L (LA) formed with the first roller rolling hole 35a and the like.

The outer surface of the return section 32 is formed with a roller rolling inner peripheral surface 37 having a groove-shaped cross-section which serves as an inner peripheral surface of a rolling element direction changing passage L4 of another endless circulation passage L (LB). In the outer surface of the return section 32, the roller rolling inner peripheral surface 37 is formed in a semicircular arc shape having the same radius of curvature as the second roller rolling hole.

The roller rolling inner peripheral surface 37 is arranged so as to cross over (extend over) the second roller rolling hole in a width direction. The second roller rolling hole (endless circulation passage LA) is arranged orthogonal to the roller rolling inner peripheral surface 37 (endless circulation passage LB).

In the outer surface of the return section 32, an inward surface 32s on a side connected to the pipe section 31 is smoothly formed. The inward surface 32s is formed with a columnar positioning boss 33. The positioning boss 33 is fitted into the positioning holes 23 formed on the end surfaces 21s of the block body 21.

Figure 4:
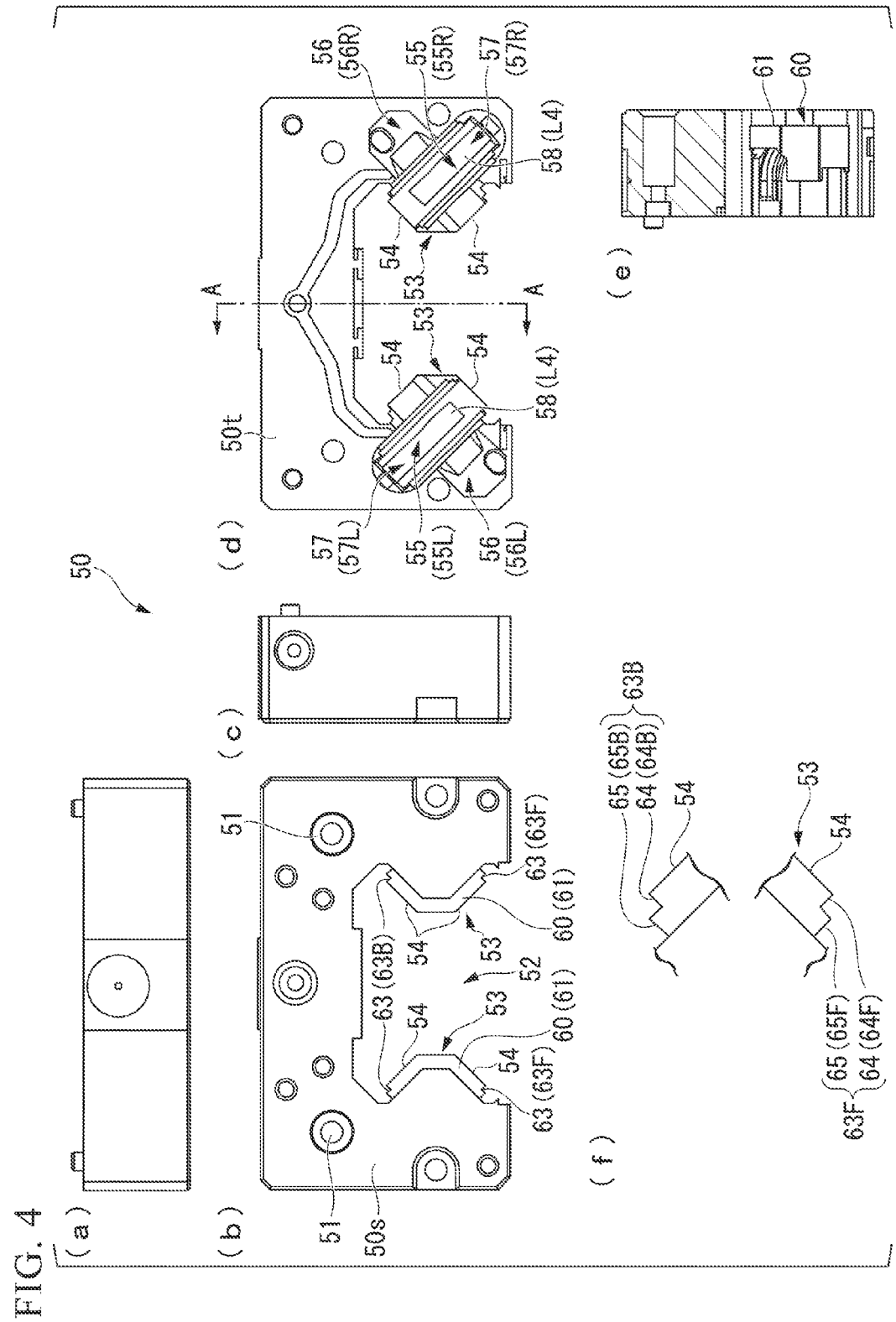
FIG. 4 is a view illustrating one end plate 50.

FIG. 4 is a view illustrating one end plate 50. Here, (a) is a top view, (b) is a front view, (c) is a right side view, (d) is a rear view, (e) is a cross-sectional view taken along line A-A, and (f) is a partial enlarged view (enlarged view of an engaged section 63). In the front view of FIG. 4(b), a vertical direction corresponds to the Z direction, a horizontal direction corresponds to the X direction, and a forward and backward (depth) direction corresponds to the Y direction.

The end plates 50 are flat resin-formed members fixed to both end surfaces 21s of the block body 21. Similarly to the block body 21, each of the end plates 50 has a "C"-shaped or "U"-shaped cross-section. The end plate 50 has a groove section 52 which is formed at a bottom surface thereof and is opened in the −Z direction. The track rail 10 is accommodated with a slight gap in the groove section 52.

A pair of inside surfaces 53 of the groove section 52 are formed with protrusion portions configured to face the recessed portions of the outside surfaces 11 of the track rail 10. The protrusion portions have the same shape as the protrusion portions formed on the inside surfaces 26 of the groove section 25 of the block body 21. The inside surfaces 53 are formed with four smooth plane surfaces 54 extending in the Y direction so as to correspond to the four rolling element rolling surfaces 28 of the block body 21.

The return sections 32 of the turn pipes 30 are disposed between the end plate 50 and the block body 21. A rear surface 50t of the end plate 50 is formed with return accommodation sections 55 which accommodate the return sections 32 of the turn pipes 30.

The return accommodation sections 55 have accommodation grooves 56 and 57 which extend in directions intersecting from the respective four plane surfaces 54. The accommodation grooves 56 and 57 are integrally formed one-by-one at both of the return accommodation sections 55, with the groove section 52 interposed therebetween.

In the rear view of FIG. 4(d), in the right return accommodation section 55R with the groove section 52 interposed between the return accommodation sections, the accommodation groove 56R is formed to have an angle of 45 degrees toward a bottom side of the groove section 52 from an opening side thereof. The accommodation groove 57R is formed to have an angle of 45 degrees toward the opening side of the groove section 52 from the bottom side thereof. The accommodation groove 56R and the accommodation groove 57R are orthogonally arranged.

In the rear view of FIG. 4(d), in the left return accommodation section 55L with the groove section 52 interposed between the return accommodation sections, the accommodation groove 56L is formed to have an angle of 45 degrees toward the opening of the groove section 52 from the bottom thereof. The accommodation groove 57L is formed to have an angle of 45 degrees toward the bottom of the groove section 52 from the opening thereof. The accommodation groove 56L and the accommodation groove 57L are orthogonally arranged.

Each of the accommodation grooves 56 (56R, 56L) is formed to be capable of accommodating a main portion of the return section 32 of the associated turn pipe 30. That is, the accommodation groove 56 accommodates a portion (rolling element direction changing passage L3) of the endless circulation passage LA. In addition, each of the accommodation grooves 57 (57R, 57L) is formed to be capable of accommodating a wall portion of the roller rolling inner peripheral surface 37 of the associated return section 32. That is, the accommodation groove 57 accommodates a portion (rolling element direction changing passage L4) of the endless circulation passage LB.

A bottom surface of the accommodation groove 57 is formed with a roller rolling outer peripheral surface 58 which serves as an outer peripheral surface of the rolling element direction changing passage L4 of the endless circulation passage LB. The roller rolling outer peripheral surface 58 is formed in a semicircular arc shape having a greater radius of curvature than the roller rolling inner peripheral surface 37.

The roller rolling inner peripheral surface 37 of the return section 32 and the roller rolling outer peripheral surface 58 of the return accommodation section 55 are paired to form the rolling element direction changing passage L4 of the endless circulation passage LB.

Each of the end plates 50 has four stepped through-holes 51 formed toward the rear surface 50t from a front surface 50s. Bolts (not shown) are inserted into the four stepped through-holes 51 and are fastened to the tapped holes 24 on the end surface 21s of the block body 21. Thereby, the end plates 50 are tightly fixed to both end surfaces 21s of the block body 21.

In the front view of FIG. 4(b), each of the protrusion portions of the pair of inside surfaces 53 of the groove section 52 has a stepped shape in which an edge thereof is lowered in the thickness direction. The stepped portion is a cover mounting section 60 on which the upper/lower cover 86 of the retainer cover 80 is mounted.

The front surface 50s side of the cover mounting section 60 is formed with a mounting surface 61 having a semicircular shape (a shape that is bent twice at an angle of 45 degrees) bent according to the protrusion shape of the inside surface 53.

Engaged sections 63 having an uneven shape in the horizontal direction (X direction) are formed at vertical direction (Z direction) of the cover mounting section 60. The engaged sections 63 are portions with which the vertical cover 86 of the retainer cover 80 engages.

Each of the engaged sections 63 is composed of a first abutted surface 64 which is orthogonal to the associated plane surface 54 of the inside surface 53 and is directed to an outer side (toward the outside surface) of the end plate 50 in a width direction thereof, and a second abutted surface 65 which is directed further to the outer side in the width direction than the first abutted surface 64 and is parallel with the first abutted surface 64. A surface which is straight and parallel to both is provided between the first and second abutted surfaces 64 and 65.

In the engaged section 63F formed at the opening side of the groove section 52, the first and second abutted surfaces 64F and 65F have an angle of 45 degrees relative to the outer side and lower side of the end plate 50 in the width direction thereof.

In the engaged section 63B formed at the deep side of the groove section 52, the first and second abutted surfaces 64B and 65B have an angle of 45 degrees relative to the outer side and upper side of the end plate 50 in the width direction thereof.

The first abutted surface 64F and the first abutted surface 64B are disposed at corresponding positions in the width direction, and intersect each other back-to-back at an angle of 90 degrees. Similarly, the second abutted surface 65F and the second abutted surface 65B are disposed at corresponding positions in the width direction, and intersect each other back-to-back at an angle of 90 degrees.

Each of the rollers (rolling element) 70 is a columnar member made of a metal material. The plurality of rollers 70 are interposed between the track rail 10 and the slider block 20 (block body 21) and serve to smoothly move the slider block 20 relative to the track rail 10.

The plurality of rollers 70 are disposed within the endless circulation passage L so as to have nearly no gap therebetween, and circulate in the endless circulation passage L. The slider block 20 is connected to the track rail 10 through the plurality of rollers 70. The slider block 20 reciprocates relative to the track rail 10 by rolling and circulation of the plurality of rollers 70.

The rollers 70 are maintained at equal intervals by a belt-shaped retainer 72. The retainer 72 has a plurality of rectangular openings formed at equal intervals in a longitudinal direction thereof. By accommodating the rollers 70 in the rectangular openings, the plurality of rollers 70 are maintained in the retainer 72. The retainer 72 has a finite shape, but the retainer 72 is arranged in an endless form in which both ends thereof are close to each other in the endless circulation passage L. The plurality of rollers 70 circulate in the endless circulation passage L together with the retainer 72.

Figure 5:
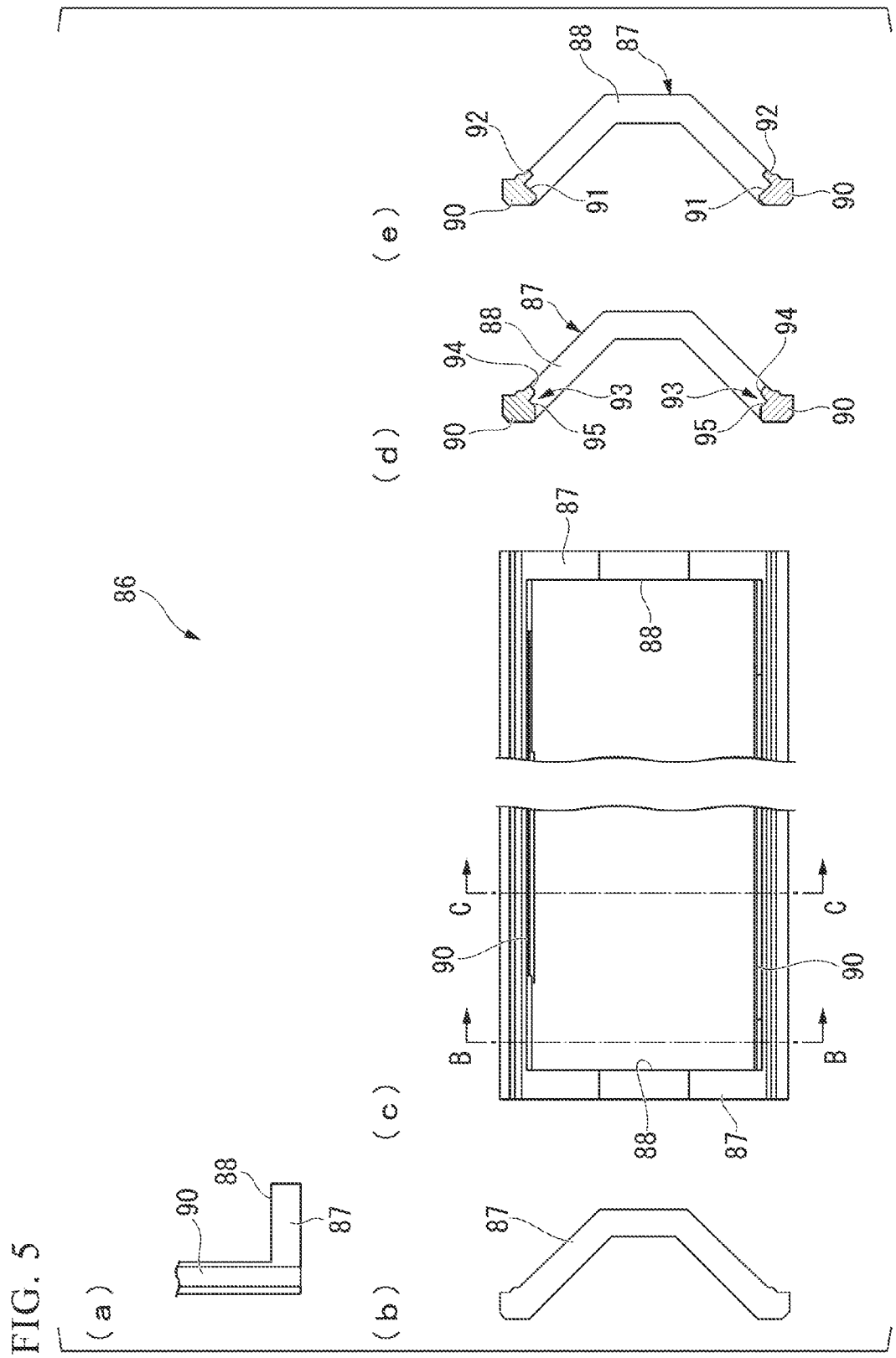
FIG. 5 is a view illustrating one upper/lower cover 86 of retainer covers 80.

FIG. 5 is a view illustrating the vertical cover 86 of the retainer cover 80. Here, (a) is a top view, (b) is a front view, (c) is a side view, (d) is a cross-sectional view taken along line B-B (both ends), and (e) is a cross-sectional view taken along line C-C (center). In the front view of FIG. 5(b), a vertical direction corresponds to the Z direction, a horizontal direction corresponds to the X direction, and a forward and backward (depth) direction corresponds to the Y direction.

The retainer cover (connector cover body) 80 prevents separation of the rollers 70 held by the retainer 72. Specifically, the retainer cover 80 holds (covers) end portions of the retainer 72, thereby indirectly preventing separation of the rollers 80.

The retainer cover 80 includes the central cover 81 disposed at a center in the vertical direction in the inside surface 26 of the groove section 25 of the block body 21, and the vertical cover 86 disposed at both sides in the vertical direction with the central cover 81 interposed therebetween. The rollers 70 are exposed between the central cover 81 and the vertical cover 86.

The central cover 81 has the same length as the block body 21 and is a resin-formed member having a bar shape with a triangular cross-section. The central cover 81 is disposed at the top of the protrusion portion formed on the inside surface 26 of the groove section 25 of the block body 21. The central cover 81 is disposed at the middle of the two rolling element rolling surfaces 28 formed on each inside surface 26.

Both longitudinal ends of the central cover 81 engage with respect to the turn pipes 30A and 30B such that the central cover 81 is interposed therebetween. Thereby, the central cover 81 is held at the top of the protrusion portion of the inside surface 26.

Among three surfaces of the central cover 81, two surfaces toward the inside surface 26 are formed with grooves 82. Both end portions of the retainer 72 in the width direction thereof, which hold the rollers 70 rolling on the rolling element rolling surface 28, are accommodated in the grooves 82 in a non-contacted state (see FIG. 2).

The vertical cover (frame-shaped cover member) 86 has the same length as the slider block 20 and is a resin-formed member having an elongated rectangular frame shape.

The vertical cover 86 is formed by connecting a pair of bar-shaped cover sections 90, which are arranged in parallel with each other, and a pair of connection sections 87 connecting both ends of the cover sections 90 in a rectangular shape.

The connection sections 87 are each formed in a shape corresponding to the cover mounting section 60 formed on the front surface 50s of the end plate 50. The connection sections 87 each have a semicircular shape (a shape that is bent twice at an angle of 45 degrees) bent according to the mounting surface 61. The pair of connection sections 87 are portions which are respectively mounted on the associated ones of the cover mounting sections 60 of the pair of end plates 50.

Each of the connection sections 87 has a rectangular cross-section. An inward surface 88 in an outer surface of the connection section 87 is arranged so as to abut or face the mounting surface 61 of the cover mounting section 60 with a slight gap.

Each of the cover sections (covering section) 90 is formed in a linear bar shape having almost the same length as the slider block 20. A portion excluding both longitudinal end sides in the cover section 90 has a substantially square cross-section (see FIG. 5(d)).

In the outer surface of the portion excluding both end sides of the cover section 90, an inward surface 91 toward the associated connection section 87 is formed with a domed section 92 protruding toward the connection section 87. Both end portions of the retainer 72 in the width direction thereof, which hold the rollers 70 rolling on the rolling element rolling surface 28, are accommodated in a space surrounded by the inward surface 91 and the domed section 92 in a non-contacted state (see FIG. 2).

Each portion of both longitudinal end sides in the cover section 90 also has a substantially square cross-section (see FIG. 5(e)). In the outer surface of each portion of both end sides of the cover section 90, a surface toward the associated connection section 87 is formed with each engagement section 93 having an uneven shape. The engagement section 93 is a portion which engages with the cover mounting section 60 (the associated engaged section 63) of the end plate 50.

The engagement section 93 is composed of a first abutting surface 94 and a second abutting surface 95. The first abutting surface 94 protrudes toward the connection section 87 and is orthogonal to a direction toward the connection section 87 (a direction intersecting each of the Z and X directions at an angle of 45 degrees). The second abutting surface 95 is lower than the first abutting surface 94 and is parallel with the first abutting surface 94. A surface which is straight and parallel to both is provided between the first and second abutting surfaces 94 and 95.

The first abutting surfaces 94 are disposed at corresponding positions in the width direction of the vertical cover 86, and intersect each other back-to-back at an angle of 90 degrees. Similarly, the second abutting surfaces 95 are disposed at corresponding positions in the width direction of the vertical cover 86, and intersect each other back-to-back at an angle of 90 degrees.

Next, an assembly process of the slider block 20 will be described.

Figure 6:
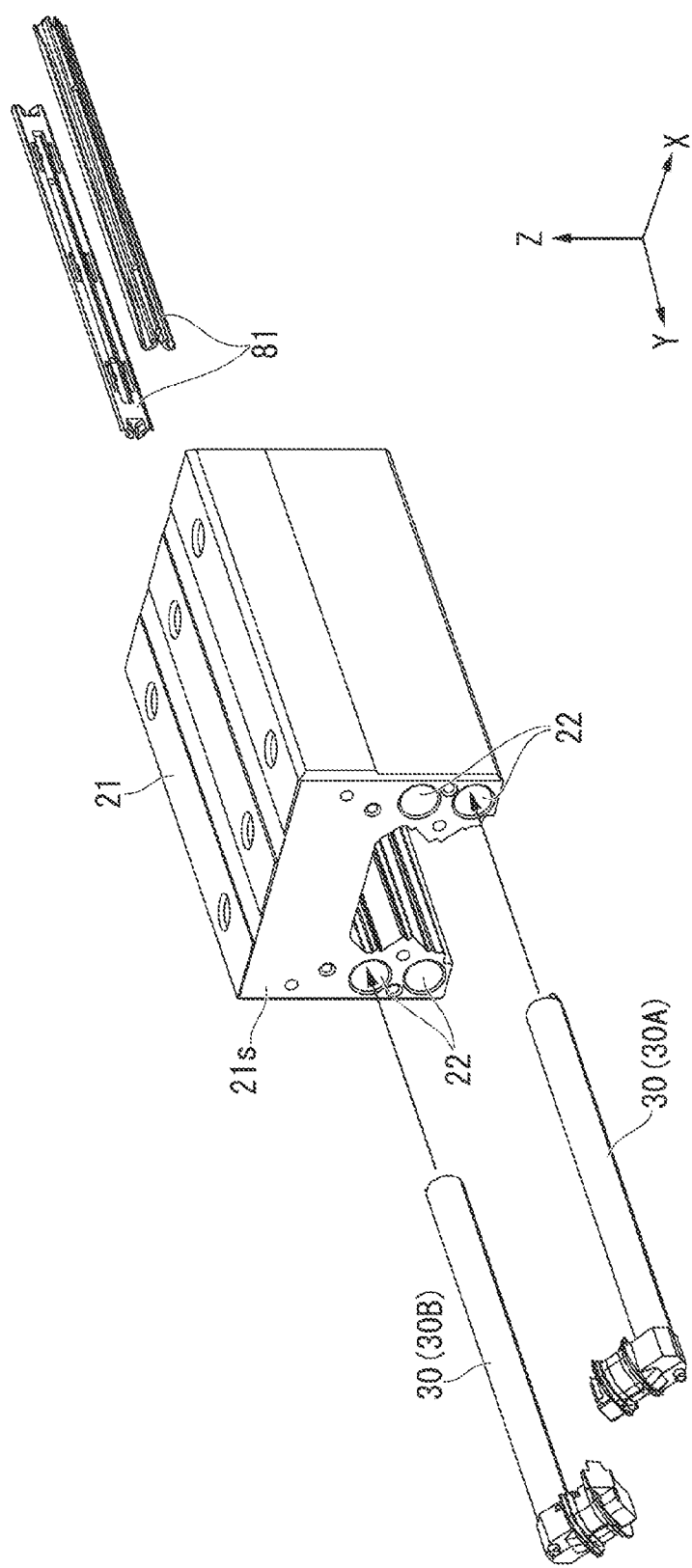
FIG. 6 is a view illustrating an assembly process (first process) of the slider block 20.

FIG. 6 is a view illustrating an assembly process (first process) of the slider block 20.

Figure 7:
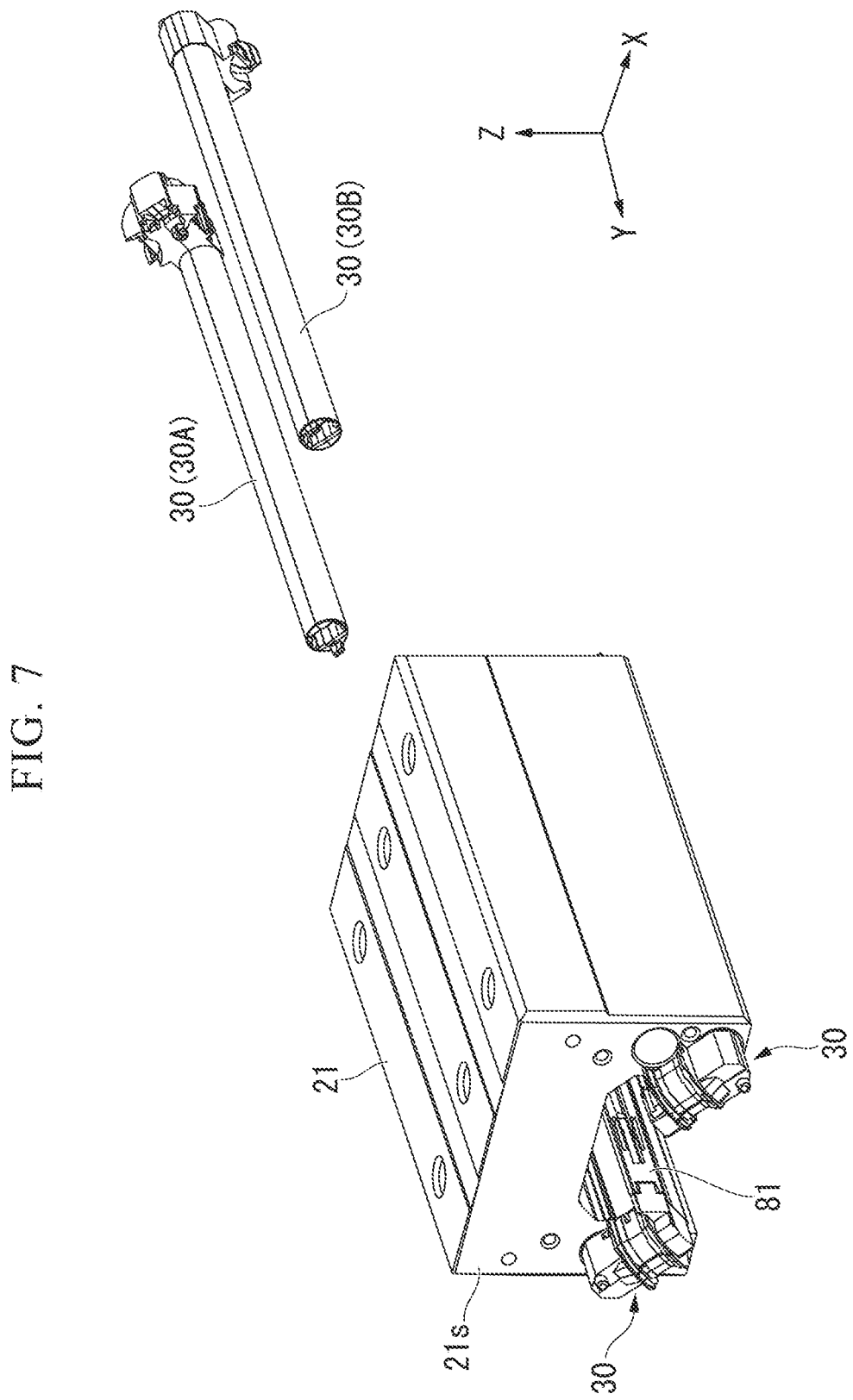
FIG. 7 is a view illustrating an assembly process (second process) of the slider block 20.

FIG. 7 is a view illustrating an assembly process (second process) of the slider block 20.

Figure 8:
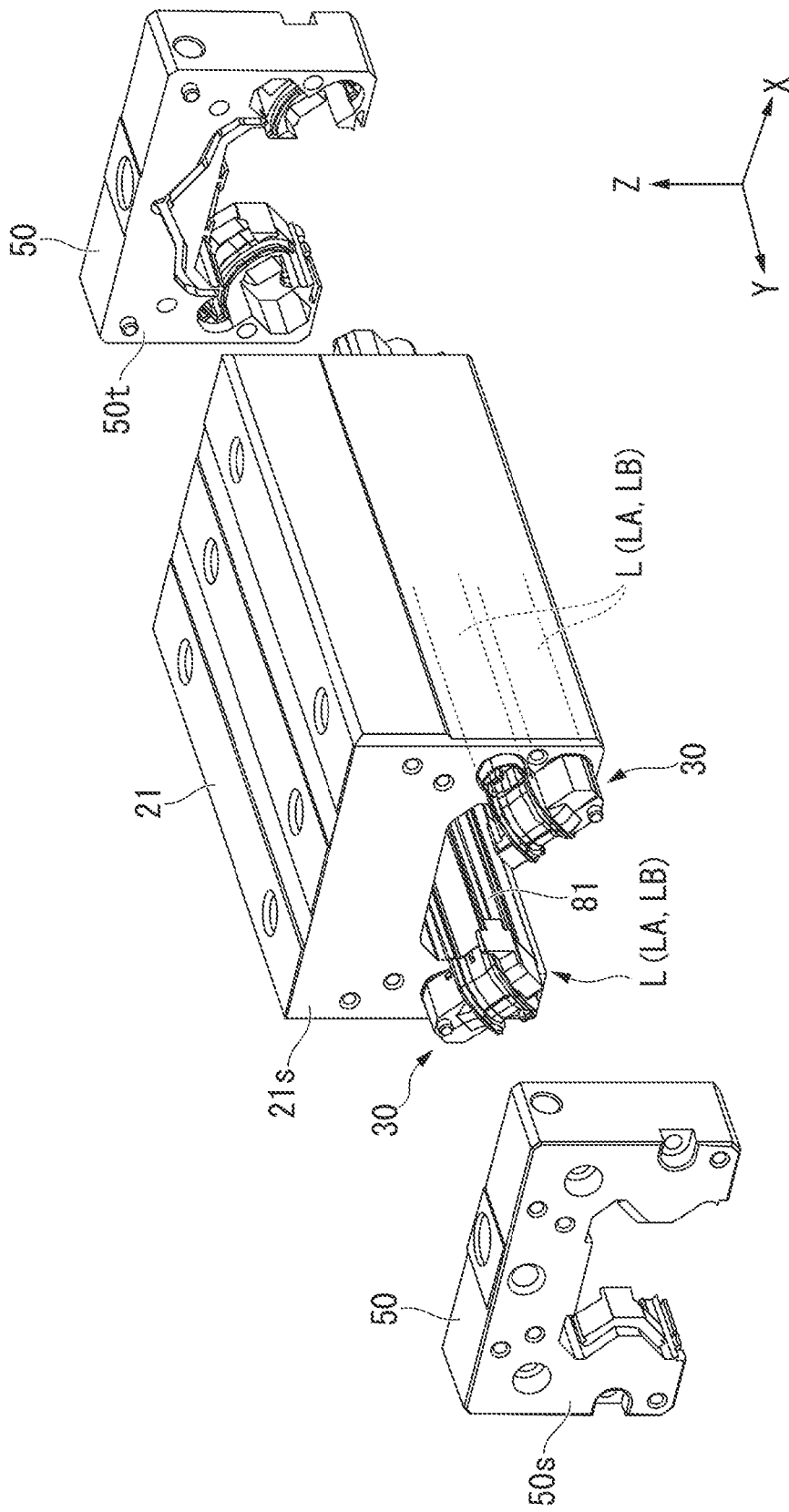
FIG. 8 is a view illustrating an assembly process (third process) of the slider block 20.

FIG. 8 is a view illustrating an assembly process (third process) of the slider block 20.

Figure 9:
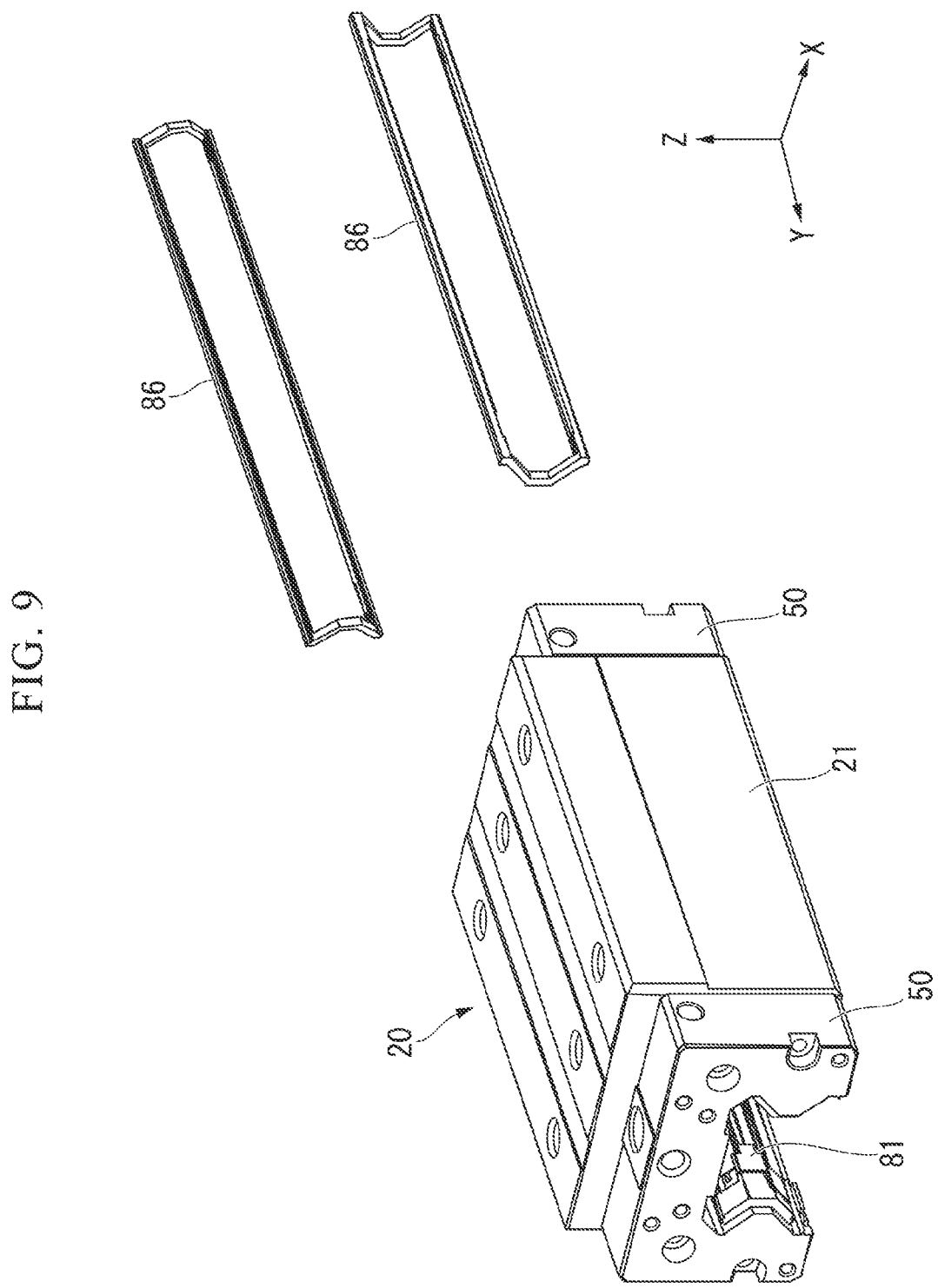
FIG. 9 is a view illustrating an assembly process (fourth process) of the slider block 20.

FIG. 9 is a view illustrating an assembly process (fourth process) of the slider block 20.

In a first process, the pipe sections 31 of the turn pipes 30 (30A, 30B) are inserted into two through-holes 22 (one-by-one in the horizontal direction) of the four through-holes 22 opened to one end surface 21s of the block body 21, as shown in FIG. 6. The positioning bosses 33 of the return sections 32 of the turn pipes 30 are fitted into the positioning holes 23 of the end surface 21s of the block body 21 so as to be positioned and fixed. One end of the central cover 81 of the retainer cover 80 is connected to each of the two turn pipes 30 mounted to the block body 21.

In a second process, the pipe sections 31 of the turn pipes 30 (30A, 30B) are inserted into two remaining through-holes 22, to which the turn pipes 30 are not mounted, of the four through-holes 22 opened to the other end surface 21s of the block body 21, as shown in FIG. 7. The turn pipe 30A and the turn pipe 30B are arranged such that the respective return sections 32A and 32B are mutually orthogonal when viewed from the Y direction.

Similarly to the first process, the positioning bosses 33 of the return sections 32 of the turn pipes 30 are fitted into the positioning holes 23 of the other end surface 21s of the block body 21 so as to be positioned and fixed. Thereby, the turn pipes 30 inserted into the block body 21 in the second process and the turn pipes 30 inserted into the block body 21 in the second process are interconnected. The other end of the central cover 81 of the retainer cover 80 is connected to each of the turn pipes 30 inserted into the block body 21 in the second process.

The two endless circulation passages L are formed by the pair of interconnected turn pipes 30A and 30B. The endless circulation passage L (LA) is formed by the roller rolling hole (not shown) of the turn pipe 30A, the roller rolling inner peripheral surface 37 of the turn pipe 30B, etc. The endless circulation passage L (LB) is formed by the roller rolling inner peripheral surface 37 of the turn pipe 30A, the roller rolling hole (not shown) of the turn pipe 30B, etc. The two endless circulation passages L (LA, LB) are in a cross-turn form orthogonal to each other when viewed from the Y direction.

In a third process, the end plates 50 are attached to both end surfaces 21s of the block body 21, as shown in FIG. 8. In this case, the return sections 32 of the turn pipes 30 are accommodated in the return accommodation sections 55 formed at each of the end plates 50. Specifically, the return section 32 of the turn pipe 30A is accommodated in the return accommodation section 55L. The return section 32 of the turn pipe 30B is accommodated in the return accommodation section 55R.

Consequently, the main portion of the return section 32 of the turn pipe 30 is accommodated in each of the accommodation grooves 56 (56R, 56L). That is, a portion (rolling element direction changing passage L3) of the endless circulation passage LA is accommodated in the accommodation groove 56.

The wall portion of the roller rolling inner peripheral surface 37 of the return section 32 is accommodated in each of the accommodation grooves 57 (57R, 57L). The roller rolling inner peripheral surface 37 of the return section 32 and the roller rolling outer peripheral surface 58 of the return accommodation section 55 are paired to form the rolling element direction changing passage L4 of the endless circulation passage L (LB). A portion (rolling element direction changing passage L4) of the endless circulation passage L (LB) is accommodated in the accommodation groove 57.

The end plate 50 is fixed to the end surface 21s of the block body 21. The bolts (not shown) are inserted into the four stepped through-holes 51 of the end plate 50 to be fastened to the tapped holes 24 on the end surface 21s of the block body 21.

Consequently, the four turn pipes 30 and the two central covers 81 are fixed to the block body 21.

When the end plate 50 is fixed to the end surface 21s of the block body 21, the plurality of rollers 70 and the retainer 72 for holding the rollers 70 are inserted into each of the four endless circulation passages L. The plurality of rollers 70 and the retainer 72 are accommodated in each of the four endless circulation passages L by means of a jig having the same shape as the end plate 50.

Initially, the jig having the same shape as the end plate 50 is disposed at one end surface 21s of the block body 21. The rollers 70 and the retainer 72 are inserted into the endless circulation passages L exposed to the other end surface 21s with which the jig is not in contact. Another end plate 50 is fixed to the other end surface 21s.

Finally, the end plate 50 is fixed in a state in which the jig is removed from one end surface 21s.

In such a manner, the plurality of rollers 70 and the retainer 72 for holding the rollers 70 are accommodated and maintained in each of the four endless circulation passages L.

In a fourth process, the vertical covers 86 of the retainer covers 80 are mounted on the pair of inside surfaces 26 of the groove section 25 of the block body 21, as shown in FIG. 9. The two connection sections 87 of each of the vertical covers 86 are mounted on the associated ones of the cover mounting sections 60 of the pair of end plates 50. As such a mounting method, a snap-fit locking method is used. The vertical covers 86 are mounted on the end plates 50 without using fastening members such as bolts, adhesive agents, or the like.

Thus, the assembly process of the slider block 20 is completed.

Next, the snap-fit locking method will be described as a method of mounting the vertical cover 86 on the end plate 50.

Figure 10A:
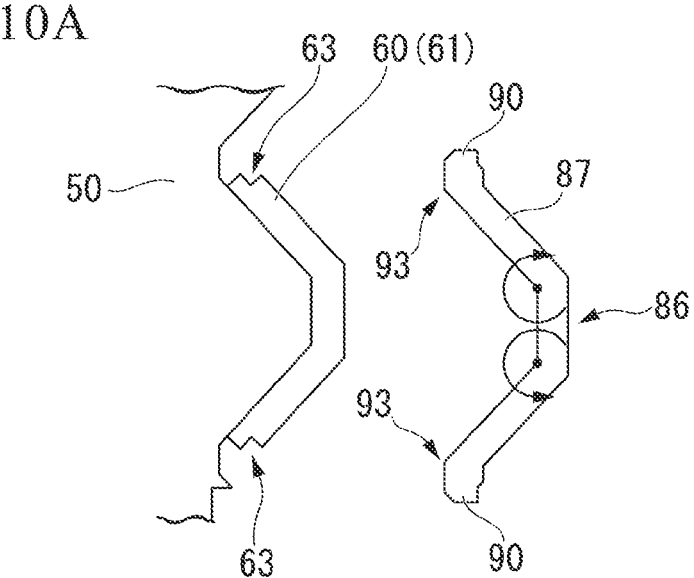
FIG. 10A is a view illustrating a snap-fit locking method of the upper/lower cover 86.

FIG. 10A is a view illustrating the snap-fit locking method of the vertical cover 86 and shows a state in which the vertical cover 86 (connection section 87) is pressed.

Figure 10B:
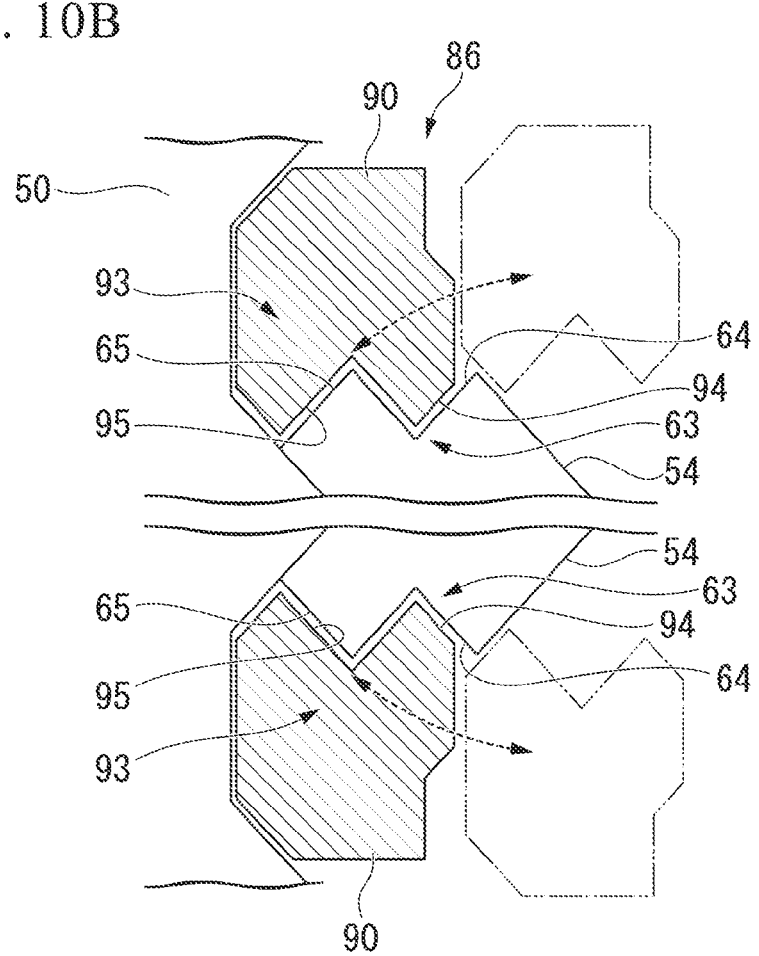
FIG. 10B is a view illustrating the snap-fit locking method of the upper/lower cover 86.

FIG. 10B is a view illustrating the snap-fit locking method of the vertical cover 86 and shows the operation of the engagement sections 93.

Figure 11A:
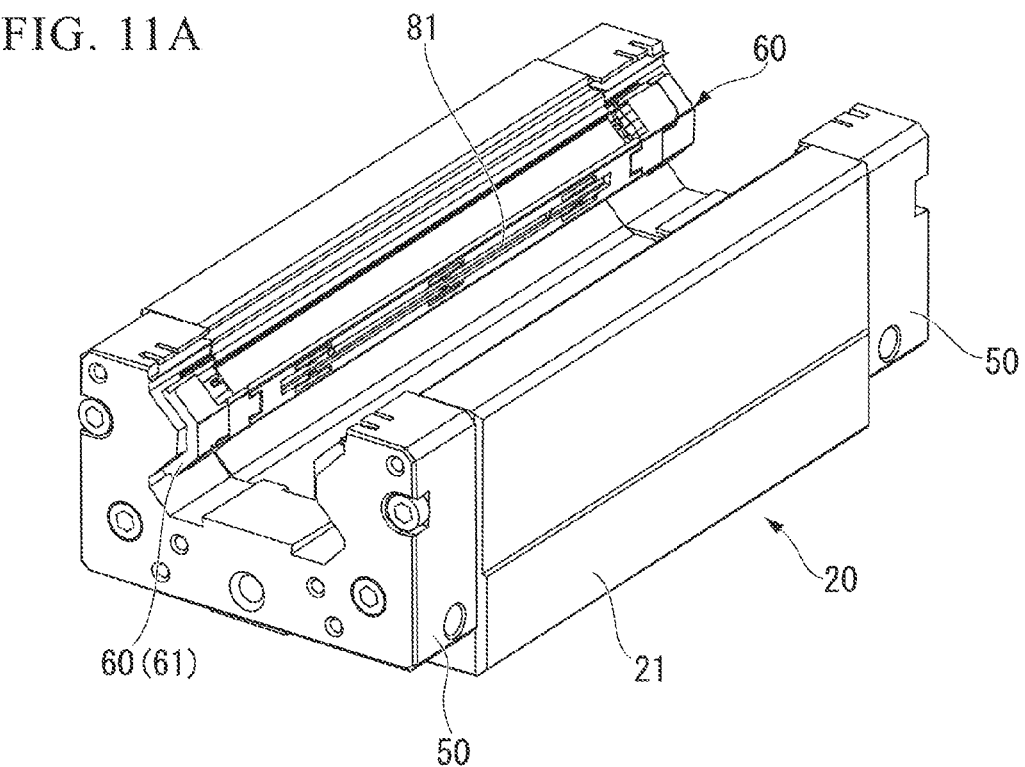
FIG. 11A is a view illustrating the snap-fit locking method of the upper/lower cover 86.
Figure 11B:
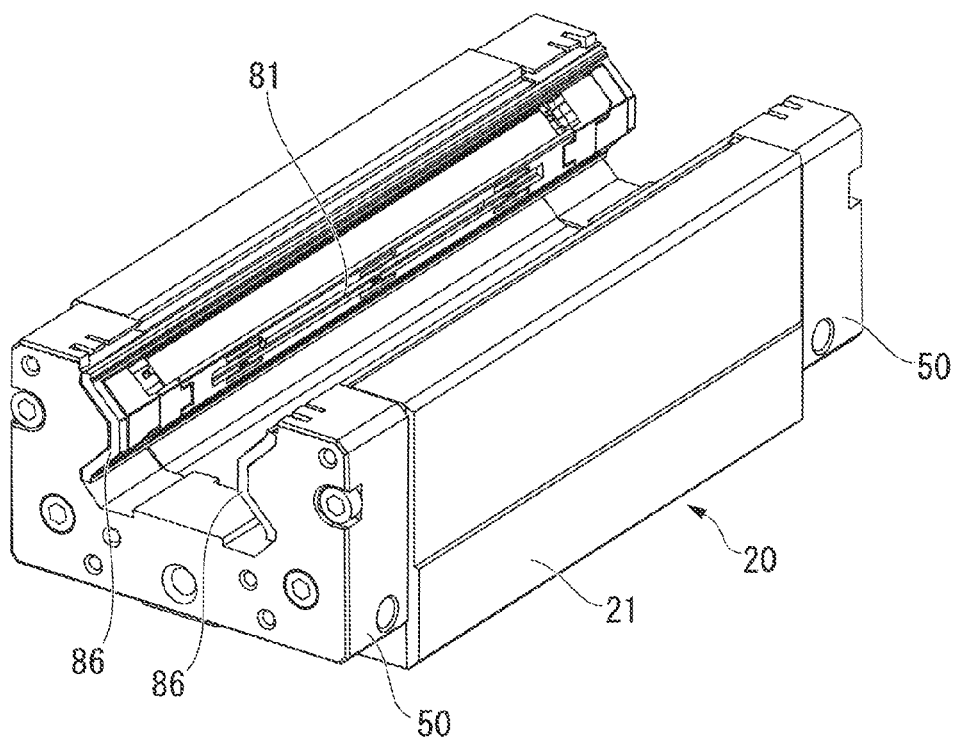
FIG. 11B is a view illustrating the snap-fit locking method of the upper/lower cover 86.

FIG. 11A is a view illustrating the snap-fit locking method of the vertical cover 86 and shows a state before the vertical cover 86 is mounted. FIG. 11B is a view illustrating the snap-fit locking method of the vertical cover 86 and shows a state after the vertical cover 86 is mounted.

When the vertical cover 86 is mounted on the end plate 50, the connection section 87 of the vertical cover 86 is pressed toward the cover mounting section 60 of the end plate 50 as shown in FIG. 10A from a state shown in FIG. 11A. The connection section 87 is pressed such that the inner peripheral side of the connection section 87 having a bent semicircular shape faces the inside surface 53 of the end plate 50.

Then, the engagement sections 93 of the pair of cover sections 90 simultaneously strike the plane surface 54 of the inside surface 53 of the end plate 50. When the vertical cover 86 is further pressed toward the end plate 50, the connection section 87 of the vertical cover 86 begins to be elastically deformed so as to be opened (rotate) about bent portions (two positions) in the vertical direction.

Consequently, the two engagement sections 93 slide on the plane surface 54 in a direction away from each other and finally cross over the plane surface 54 to reach the engaged sections 63, as shown in FIG. 10B. The second abutted surface 95 crosses over the plane surface 54 and the stepped portion between the first and second abutted surfaces 64 and 65 to reach the second abutted surface 65. Simultaneously, the first abutted surface 94 crosses over the plane surface 54 to reach the first abutted surface 64.

Thus, the pair of engagement sections 93 of the vertical cover 86 simultaneously engage with the two engaged sections 63B and 63F of one inside surface 53 of the end plate 50. The first abutted surface 64 of each engagement section 93 is pressed against (abuts) the first abutting surface 94 of the associated engaged section 63. The second abutted surface 65 of the engagement section 93 is pressed against (abuts) the second abutting surface 95 of the engaged section 63. In particular, adhesion between the second abutted surface 65 and the second abutting surface 95 contributes to maintenance of the vertical cover 86.

Since the elastic deformation of the connection section 87 is restored when the engagement section 93 crosses over the plane surface 54, the engagement section 93 is nearly pressed against the engaged section 63. Since the engagement section 93 and the engaged section 63 are in an undercut form toward the plane surface 54, the engagement section 93 may not return back to the plane surface 54 when no external force is applied to the vertical cover 86.

As shown in FIG. 11B, when the engagement section 93 crosses over the plane surface 54, the connection section 87 of the vertical cover 86 is simultaneously accommodated in the cover mounting section 60 of the end plate 50. The two vertical covers 86 are mounted on the pair of end plates 50 fixed to the block body 21 so as to be laid on the end plates 50.

The mounting surface 61 of the cover mounting section 60 and the inward surface 88 of the connection section 87 face each other with a slight gap without full adhesion therebetween. Therefore, the vertical cover 86 is slightly movable in the Y direction relative to the end plate 50 and the block body 21. This is to prevent stress from being applied to the vertical cover 86 even when the block body 21 is thermally expanded to stretch in the Y direction.

Thus, the vertical cover 86 is mounted on the end plate 50 by the snap-fit locking method.

As described above, according to the linear motion guide 1, it may be possible to reduce the number of parts of the retainer cover 80 (vertical cover 86) of the slider block 20. Thereby, efficiency of assembly time of the retainer cover 80 (vertical cover 86), a reduction in product cost, etc. may be achieved.

Since the vertical cover 86 is mounted on the end plate 50 by the snap-fit locking method, efficiency of the assembly operation may be achieved. Since the vertical cover 86 is easily removed from the end plate 50, a working property at the time of repair may also be improved.

Since the snap-fit locking method (engaged sections 63, engagement sections 93) is applied in the longitudinal direction of the slider block 20, the snap-fit locking method is not affected by the thermal expansion and thermal contraction of the block body 21.

Since the connection sections 87 connecting the pair of the cover sections 90 are elastically deformed, the pair of the cover sections 90 may be simultaneously mounted on the end plates 50 by the snap-fit locking method.

The mounting surface 61 of the cover mounting section 60 and the inward surface 88 of the connection section 87 face each other with a slight gap without full adhesion therebetween. Therefore, it may be possible to prevent an adverse effect generated in rolling of the rollers 70 and the retainer 72 due to application of stress to the vertical cover 86 when the block body 21 is thermally expanded.

FIG. 12 is a view illustrating a modified example of the vertical cover (vertical cover 186). Here, (a) is a top view, (b) is a front view, (c) is a side view, (d) is a cross-sectional view taken along line D-D (both ends), and (e) is a cross-sectional view taken along line E-E (center). In the front view of FIG. 12(b), a vertical direction corresponds to the Z direction, a horizontal direction corresponds to the X direction, and a forward and backward direction corresponds to the Y direction.

FIG. 13 is a view illustrating a fixed state of the vertical cover 186 (see FIGS. 4(d) and 12(c)).

In the vertical cover 186, like reference numerals refer to the same parts as the upper/lower cover 86.

When the length of the block body 21 in the Y direction is set to be large, the length of the retainer cover 80 in the Y direction should also be set to be large accordingly. The vertical cover (frame-shaped cover member) 186 has a large length in the Y direction. For this reason, the central portion of the cover section 90 easily oscillates in the X direction or the like, and the rollers 70 and the retainer 72 have a risk of being separated from the load rolling element rolling passage L1.

Accordingly, the vertical cover 186 is configured such that tension in the Y direction is applied to the cover section 90 when the vertical cover 186 is fixed to the end plate 50, thereby preventing the central portion of the cover section 90 from oscillating.

As shown in FIG. 12(a), protrusion sections (tension application sections) 189 protruding in the Y direction are formed on the inward surface 88 of the connection section 87 of the vertical cover 186. A protrusion amount of each protrusion section 189 is set such that a distance between the protrusion sections 189 facing each other in the Y direction is slightly smaller than a distance between the mounting surfaces 61 of the pair of end plates 50. Thereby, when the vertical cover 186 is fixed to the end plate 50, the tension in the Y direction is applied to the cover section 90.

The protrusion section 189 is formed at a region close to the cover section 90 in the inward surface 88 of the connection 87. Consequently, as shown in FIG. 13, the tension is applied such that the central portion of the cover section 90 is bent in a direction (Z direction) close to the rollers 70 and the retainer 72. The bending tension is applied such that the central portions of the pair of the cover sections 90 are close to each other. This is because the central portion of the connection section 87 is inclined toward the inward surface 88 by forming the protrusion sections 189 at both end sides of the inward surface 88 of the connection section 87.

As a result, the risk of the rollers 70 and the retainer 72 being separated from the load rolling element rolling passage L1 is decreased more by using the vertical cover 186.

Although shapes and combinations of the components have been illustratively described in the above embodiment, specific configurations are not limited thereto and a design modification may be made appropriately without departing from the principles and spirit of the invention.

The rolling element is not limited to the roller. For example, the rolling element may also be a ball.

The retainer cover 80 (central cover 81, upper/lower cover 86) is not limited to a case in which the retainer cover 80 is not in contact with the rollers 70 and the retainer 72. In some cases, the retainer cover 80 may also be in contact with the rollers 70 and the retainer 72. In some cases, the retainer cover 80 may not be in contact with the rollers 70 and the retainer 72 when the slider block 20 is stopped, and the retainer cover 80 may be in contact with the rollers 70 and the retainer 72 when the slider block 20 is moved.

The turn pipe 30 is not limited to the cross-turn form. The turn pipe 30 need not include the pipe section 31. A return guide or the like may also serve as a member that contributes to a change in direction of the rolling element.

REFERENCE SIGNS LIST

1: linear motion guide (motion device)
10: track rail (track body)
20: slider block
21: block body (moving body)
28: rolling element rolling surface
50: end plate (lid body)
61: mounting surface (regulatory surface)
63: engaged section (snap-fit engaged section)
70: roller (rolling element)
72: retainer (rolling element connector)
80: retainer cover (connector cover body)
81: central cover
86: vertical cover (frame-shaped cover member)
87: connection section
88: inward surface
90: cover section (covering section)
91: inward surface
93: engagement section (snap-fit engagement section)
186: vertical cover (frame-shaped cover member)
189: protrusion section (tension application section)
L: endless circulation passage

The invention claimed is:

1. A motion device comprising:
a track rail;
a moving body movable along the track rail;
a plurality of rolling elements rolling in an endless circulation passage formed at the track rail and the moving body;
a pair of lid bodies attached to end surfaces of the moving body in a movement direction thereof; and
a connector cover body disposed along a rolling element rolling surface formed at the moving body to cover a rolling element connector, the connector cover body holding the rolling elements,
wherein the connector cover body comprises a vertical cover,
the vertical cover comprises a first cover section, a second cover section, a first connection section, and a second connection section,
the first cover section and the second cover section are formed in a bar-shape and arranged in parallel with each other,
the first connection section connects a first end of the first cover section to a first end of the second cover section,
the second connection section connects a second end of the first cover section to a second end of the second cover section,
the vertical cover is fixed between the pair of the lid bodies, and
the vertical cover is integrally disposed at the rolling element rolling surface,
the vertical cover is snap-fitted and fixed between the pair of the lid bodies,
the first cover section and the second cover section are disposed along the rolling element rolling surface,
each of the first cover section and the second cover section has a snap-fit engagement section on an inner peripheral surface thereof,
each of the lid bodies has snap-fit engaged sections on a surface thereof which faces the track rail,
one of the snap-fit engaged sections is engaged with the snap-fit engagement section of the first cover section, and
the other of the snap-fit engaged sections is engaged with the snap-fit engagement section of the second cover section.

2. The motion device according to claim 1, wherein:
the first connection section and the second connection section are elastically deformed in a state where the snap-fit engagement section of the first cover section and the snap-fit engagement section of the second cover section are engaged with the respective snap-fit engaged sections.

3. The motion device according to claim 2, wherein the vertical cover has tension application sections which apply tension to the first cover section and the second cover section, and
the tension application sections are provided on respective inner peripheral surfaces of the first connection section and the second connection section.

4. The motion device according to claim 2, wherein the lid bodies have regulatory surfaces facing respective inner peripheral surfaces of the first connection and the second connection section to restrict movement of the vertical cover.

* * * * *